(No Model.)
W. W. CONDER.
MILK COOLER.
No. 430,336. Patented June 17, 1890.
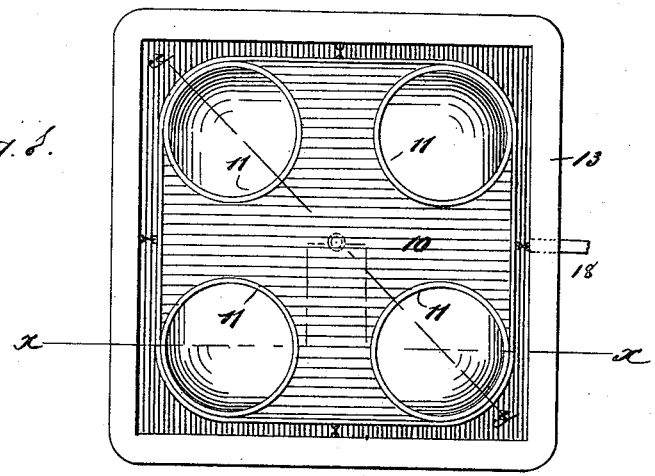
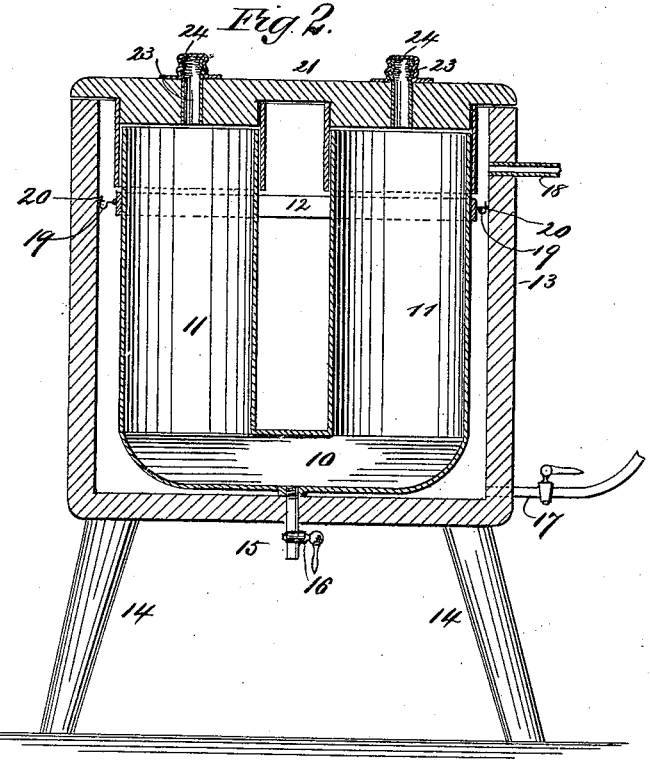
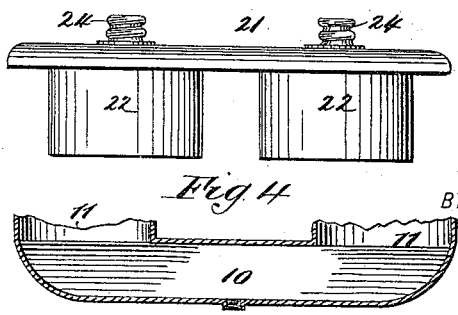
WITNESSES:
INVENTOR:
W. W. Conder
BY Munn & Co.
ATTORNEYS.

UNITED STATES PATENT OFFICE.

WILLIAM W. CONDER, OF HEBO, OREGON.

MILK-COOLER.

SPECIFICATION forming part of Letters Patent No. 430,336, dated June 17, 1890.

Application filed October 2, 1889. Serial No. 325,743. (No model.)

*To all whom it may concern:*

Be it known that I, WILLIAM W. CONDER, of Hebo, in the county of Tillamook and State of Oregon, have invented a new and Improved Milk-Cooler, of which the following is a full, clear, and exact description.

This invention relates to milk-coolers, the object of the invention being to provide a series of small deep receptacles, which shall be in free communication at their lower ends, it being a well-understood fact that cream will rise more thoroughly in such small deep receptacles than in vessels of large cross-sectional area.

In carrying out my invention I provide lower compartments, and in communication therewith arrange a series of upwardly-extending cans or vessels, the whole being placed within a tank or receptacle, as will be hereinafter more fully explained, and specifically pointed out in the claims.

Reference is to be had to the accompanying drawings, forming a part of this specification, in which similar figures of reference indicate corresponding parts in all the views.

Figure 1 is a plan view of my improved milk-cooler, the top or cover being removed. Fig. 2 is a cross-sectional elevation, the view being taken on line $x\ x$ of Fig. 1. Fig. 3 is a side view of the cover, and Fig. 4 is a cross-sectional view of the lower portion of the milk-receptacle.

In the drawings, 10 represents a lower vessel, in communication with which there are placed a number of upwardly-extending vessels 11, such vessels being braced and supported by a hoop or band 12, that is soldered or otherwise secured thereto, as represented in the drawings. The milk-receptacle arranged as above described is placed in a tank 13, that is supported by legs 14. A discharge-pipe 15 is connected with the bottom of the vessel 10, and extends downward through the bottom of the tank 13, such pipe being provided with a stop-cock 16.

Water is led to the tank 13 through a pipe 17, and discharged therefrom through a waste-pipe 18, and in order that the milk-receptacle may be held to place at times when it is not filled with milk I provide hooks 19, that are preferably connected to the bands 12 and arranged to engage staples 20, that are arranged as shown.

The cover 21 of the tank 13 is provided with downwardly-extending flanges 22, which fit closely about the vessels 11, and through this cover there are passed vent-tubes 23, so located as to communicate with the vessels, the vent-tubes being provided with caps 24, which may be turned off to permit the escape of the animal heat contained in the milk.

In operation the milk to be cooled is placed within the receptacle, and water is admitted through the pipe 17, which is so located that the incoming water will strike against the bottom of the milk-receptacle and flow out near the top of such receptacle, this arrangement being exceedingly advantageous, inasmuch as the cream rises with great rapidity, and it, together with the milk, remains sweet for a long time.

Having thus described my invention, I claim as new and desire to secure by Letters Patent—

1. In a milk-cooler, a milk pan or receptacle consisting of the vessel 10 and the vessels 11, projecting upwardly from the top of the vessel 10, the said vessels 11 being in communication with the vessel 10 through their open lower ends, substantially as described.

2. In a milk-cooler, the combination, with a water-tank, of a milk-receptacle consisting of the lower vessel 10 and the upwardly-projecting vessels 11, communicating with the vessel 10 through their open lower ends, and a cover for the tank provided with downwardly-projecting flanges fitting on the upper ends of the vessels 11, substantially as herein shown and described.

3. In a milk-cooler, the combination, with a lower vessel, of vessels 11, that are in free communication therewith, a band by which the vessels 11 are strengthened, a tank, a means for holding the milk-receptacle within the tank, induction and eduction pipes leading to and from the tank, a cover, flanges carried by the cover and arranged to fit about the vessels, and vent-tubes which extend through the cover, substantially as described.

WILLIAM W. CONDER.

Witnesses:
J. M. KNIFONG,
RILEY HUSSEY.